US010780825B1

(12) United States Patent
Nathan

(10) Patent No.: US 10,780,825 B1
(45) Date of Patent: Sep. 22, 2020

(54) SYSTEM AND A METHOD FOR ALERTING A DRIVER OF PRESENCE OF A PASSENGER IN A VEHICLE

(71) Applicant: Milton Nathan, Orlando, FL (US)

(72) Inventor: Milton Nathan, Orlando, FL (US)

(*) Notice: Subject to any disclaimer, the term of this patent is extended or adjusted under 35 U.S.C. 154(b) by 0 days.

(21) Appl. No.: 16/448,233

(22) Filed: Jun. 21, 2019

(51) Int. Cl.
*B60Q 9/00* (2006.01)
*B60Q 1/26* (2006.01)

(52) U.S. Cl.
CPC .......... *B60Q 9/00* (2013.01); *B60Q 1/2673* (2013.01)

(58) Field of Classification Search
CPC ........ B60Q 9/00; B60Q 1/2673; G08B 21/06; G08B 21/22; G08B 21/24; G08G 1/166; B60W 50/14; H04W 4/40; B60H 1/00742; B60N 2/002
See application file for complete search history.

(56) References Cited

U.S. PATENT DOCUMENTS

| | | | |
|---|---|---|---|
| 7,646,288 B2 | 1/2010 | Wiley | |
| 8,892,302 B1* | 11/2014 | McDonald | G08B 21/24 701/36 |
| 9,403,437 B1* | 8/2016 | McDonald | B60K 37/02 |
| 9,809,085 B1* | 11/2017 | Pierce | B60H 1/00742 |
| 9,977,935 B1 | 5/2018 | Laranang | |
| 2009/0027188 A1* | 1/2009 | Saban | B60N 2/002 340/521 |
| 2010/0302022 A1* | 12/2010 | Saban | B60N 2/002 340/459 |
| 2018/0050575 A1* | 2/2018 | Campbell | B60H 1/008 |
| 2019/0018411 A1* | 1/2019 | Herbach | G06K 9/00838 |
| 2019/0092127 A1* | 3/2019 | Nguyen | B60H 1/00742 |
| 2019/0147262 A1* | 5/2019 | Kuehnle | B60W 40/09 340/439 |
| 2019/0351915 A1* | 11/2019 | Yvon | B60W 50/16 |
| 2019/0357834 A1* | 11/2019 | Aarts | A61B 5/18 |
| 2020/0001895 A1* | 1/2020 | Scheggi | B60W 50/16 |

\* cited by examiner

*Primary Examiner* — Orlando Bousono
(74) *Attorney, Agent, or Firm* — Sanchelima & Associates, P.A.; Christian Sanchelima; Jesus Sanchelima

(57) ABSTRACT

A system and a method of alerting a driver of a vehicle of the presence of a passenger in the vehicle are disclosed. The system comprises a control unit in the vehicle to detect the status of an ignition switch in the vehicle. The system further comprises a control device coupled to the control unit. The system further comprises a plurality of wearable devices, each wearable devices is worn by a passenger in the vehicle. The control unit detects turning OFF of the ignition switch and sends a signal to the control device. The control device sends a transmission signal to the wearable devices to determine the presence of any of the wearable devices. The control device generates an alert to the driver when any of the wearable devices respond to the transmission signal indicating presence of the passenger inside the vehicle when the ignition switch is turned OFF.

7 Claims, 4 Drawing Sheets

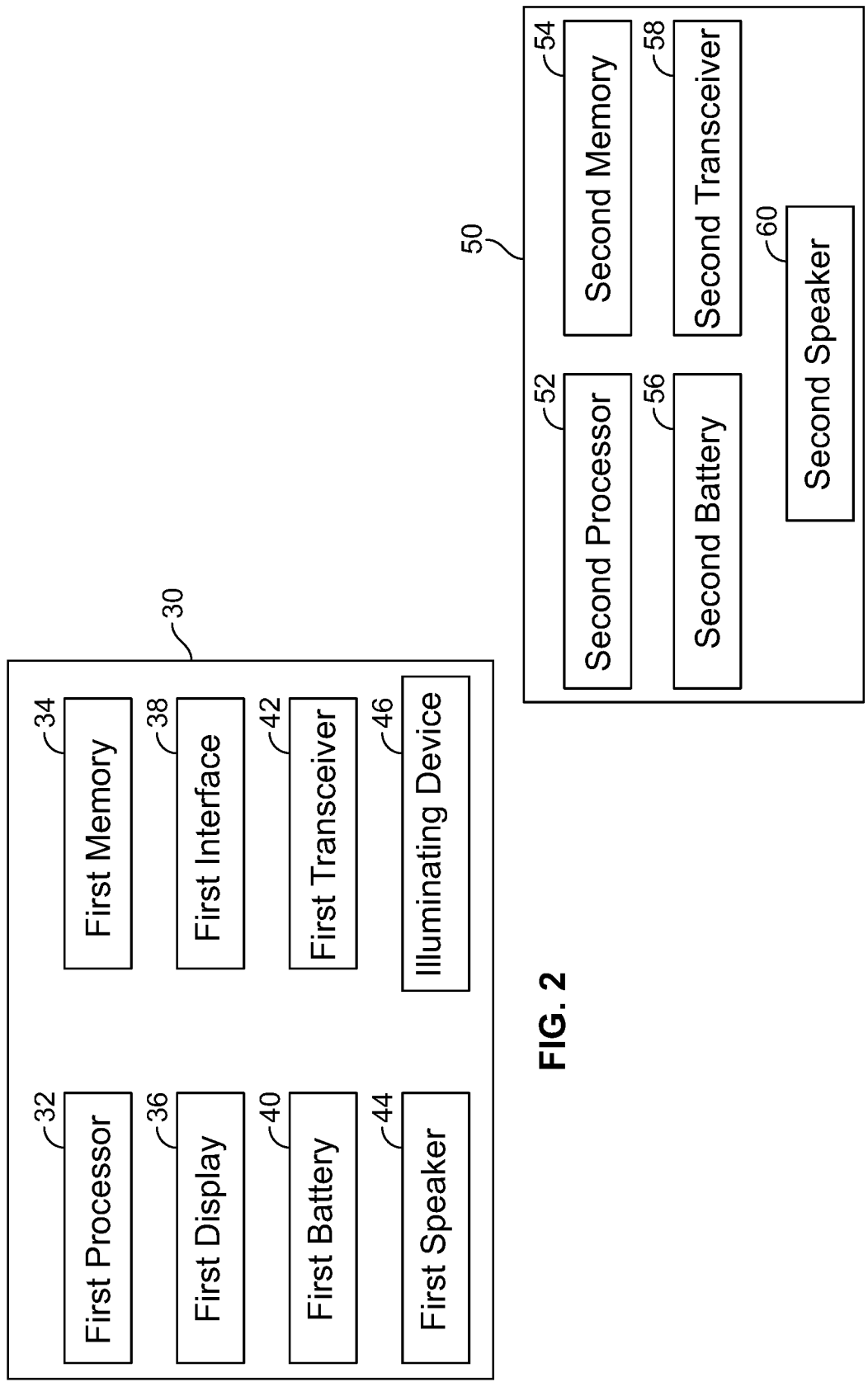

SYSTEM AND A METHOD FOR ALERTING A DRIVER OF PRESENCE OF A PASSENGER IN A VEHICLE

BACKGROUND OF THE INVENTION

1. Field of the Invention

The present invention generally relates to a system and a method for alerting a driver of the presence of a passenger in a vehicle. More specifically, the present invention relates to a system for alerting a driver of the presence of a passenger in a vehicle after ignition of the vehicle has been turned OFF.

2. Description of the Related Art

It is known that vehicles capable of carrying many passengers such as buses are commonly used to transport people from one place to another. For example, the vehicles are used to transport children between their homes and schools. Unfortunately, the children may fall asleep during the ride or not awaken when the vehicle reaches their destination, or even the end of the run. Further, the children or a severely handicapped individual may fall asleep, or may not be able to provide some indication of their presence aboard at the end of the run. If a driver of the vehicle does not pay attention to the children or the handicapped individual, then there is a risk for the children or the handicapped individual to remain aboard for significant periods of time. Further complicating the matter is the likelihood that the vehicle is parked in a remote location where the crying or screams of the children may not be sufficiently loud to be heard at any distance from the vehicle.

One solution to above problem may include having a policy, which makes it mandatory for the drivers of the vehicles to manually check at the end of the run. However, it is not practically possible to implement the policy at all times since people i.e., the drivers tend to breach the policy or do an incomplete check that the children are left aboard the vehicle at the end of the run.

In order to overcome above problems, several solutions have been provided in the past that discloses alarm devices for alerting a user when the user leaves a child unattended in a vehicle.

One such example is disclosed in U.S. Pat. No. 9,977,935. In U.S. Pat. No. 9,977,935B1, it is disclosed that methods, systems, and apparatus, including computer programs encoded on computer storage media, for student accountability systems. School buses can be equipped with a bus system that executes a driver application. Students carry student identification (ID) systems that identify the students to the bus system, which in turn reports a geographic location to a student accountability system. The bus system is configured to permit rapid boarding and easy usage by drivers. The student accountability system provides a parent portal and an administrator portal to monitor the students and provide other useful functions.

Another example is disclosed in U.S. Pat. No. 7,646,288. In U.S. Pat. No. 7,646,288B2, it is disclosed that the present invention is a warning system for alerting a driver and others to ensure an examination is made of a school or day care bus or van is thoroughly examined for remaining occupants following a transportation run.

Another example is disclosed in a United States patent application 20160330570. In US20160330570A1, it is disclosed that a proximity alarm system includes a vehicle that may have a user and a child positioned therein. A base unit is provided, and the base unit may be worn by the child when the child is in the vehicle. A remote unit is provided, and the remote unit may be worn by the user. The remote unit is in electrical communication with the base unit wherein the remote unit determines a distance between the base unit and the remote unit. The remote unit issues an alarm when the remote unit is moved beyond a trigger distance from the base unit. Thus, the remote unit alerts the user that the child has been left in the vehicle.

Yet another example is disclosed in a United States patent application 20050083190. In US20050083190A1, it is disclosed that a child safety warning device alerts a driver of the presence of a child within the vehicle after the driver has turned off the vehicle ignition. The child safety warning device is compact and can be easily transported between vehicles. Further, the simple design of the child safety warning device enables the device to be produced at a relatively low cost when compared with other child safety warning devices. Specifically, the child safety warning device includes a portable housing, a recording device located within the housing, a connector coupled to the housing and adapted to fit within a vehicle socket, and a switching device coupled to the recording device and the connector. The switching device provides a signal to the recording device indicative of an ignition state of a vehicle. The recording device plays back a prerecorded message in response to the signal provided by the switching device to warn the vehicle driver of the presence of a child within the vehicle when the ignition is turned off.

Although the above disclosures are helpful in alerting a driver of the presence of a child within the vehicle after the driver has turned off the vehicle ignition, they have few disadvantages. For instance, some of the disclosures include a proximity alarm system, which will trigger an alarm once the ignition of the vehicle is tuned OFF. In some instances, the alarm may go off after a time delay from the moment the ignition is turned off. This may result in driver getting off the vehicle and walking away and may not hear the alarm thereby leaving the children inside the vehicle.

Other documents describing the closest subject matter provide for a number of more or less complicated features that fail to solve the problem in an efficient and economical way. None of these patents suggest the novel features of the present invention. Specifically, none of the disclosures in the art disclose a system for alerting a driver of presence of an occupant in a vehicle after ignition of the vehicle has been turned OFF.

Therefore, there is a need in the art for a system for alerting a driver of presence of an occupant in a vehicle after ignition of the vehicle has been turned OFF.

SUMMARY OF THE INVENTION

It is one of the main objects of the present invention to provide a system for alerting a driver of presence of an occupant in a vehicle and avoids the drawbacks of the prior art.

It is one object of the present invention to provide a system for alerting a driver of presence of an occupant in a vehicle after ignition of the vehicle has been turned OFF.

It is one object of the present invention to provide a system for alerting a driver of a vehicle of presence of a passenger in the vehicle. The system comprises a control unit provided in the vehicle to detect status of an ignition switch of the vehicle. The system further comprises a control device operatively coupled to the control unit. The system further comprises a plurality of wearable devices, each of the wearable devices being worn by a passenger in the vehicle. The control unit detects turning OFF of the ignition switch and sends a signal to the control device. The control device sends a transmission signal to the plurality of wearable devices to determine presence of one or more of the plurality of wearable devices. The control device generates an alert to the driver when one or more of the plurality of wearable devices responds to the transmission signal indicating presence of the passenger inside the vehicle when the ignition switch of the vehicle is turned OFF.

It is one object of the present invention to provide a method of alerting a driver of a vehicle of presence of a passenger in the vehicle. The method comprises detecting by a control unit of a vehicle, whether an ignition switch of the vehicle has been turned OFF. The method further comprises detecting, by a control device, presence of one or more of the plurality of wearable devices in the vehicle. The detecting comprises sending a transmission signal to the plurality of wearable devices and receiving a response to the transmission signal from one or more of the plurality of wearable devices. The method further comprises generating, an alert by the control device, to the driver when one or more of the plurality of wearable devices responds to the transmission signal indicating presence of the passenger inside the vehicle.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 2 illustrates a block diagram of a control device 30 provided in the vehicle 12, in accordance with one embodiment of the present disclosure;

FIG. 3 illustrates a block diagram of a wearable device 50, in accordance with one embodiment of the present disclosure;

DETAILED DESCRIPTION OF THE EMBODIMENTS OF THE INVENTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure discloses a system for alerting a driver of a vehicle of presence of a passenger in the vehicle. The system comprises a control unit provided in the vehicle to detect status of an ignition switch of the vehicle. The system further comprises a control device operatively coupled to the control unit. The system further comprises a plurality of wearable devices, each of the wearable devices being worn by a passenger in the vehicle. The control unit detects turning OFF of the ignition switch and sends a signal to the control device. The control device sends a transmission signal to the plurality of wearable devices to determine presence of one or more of the plurality of wearable devices. The control device generates an alert to the driver when one or more of the plurality of wearable devices responds to the transmission signal indicating presence of the passenger inside the vehicle when the ignition switch of the vehicle is turned OFF.

Various features and embodiments of a system and method for alerting a driver of a vehicle of presence of a passenger in the vehicle are explained in conjunction with the description of FIGS. 1-5.

Figure 1:
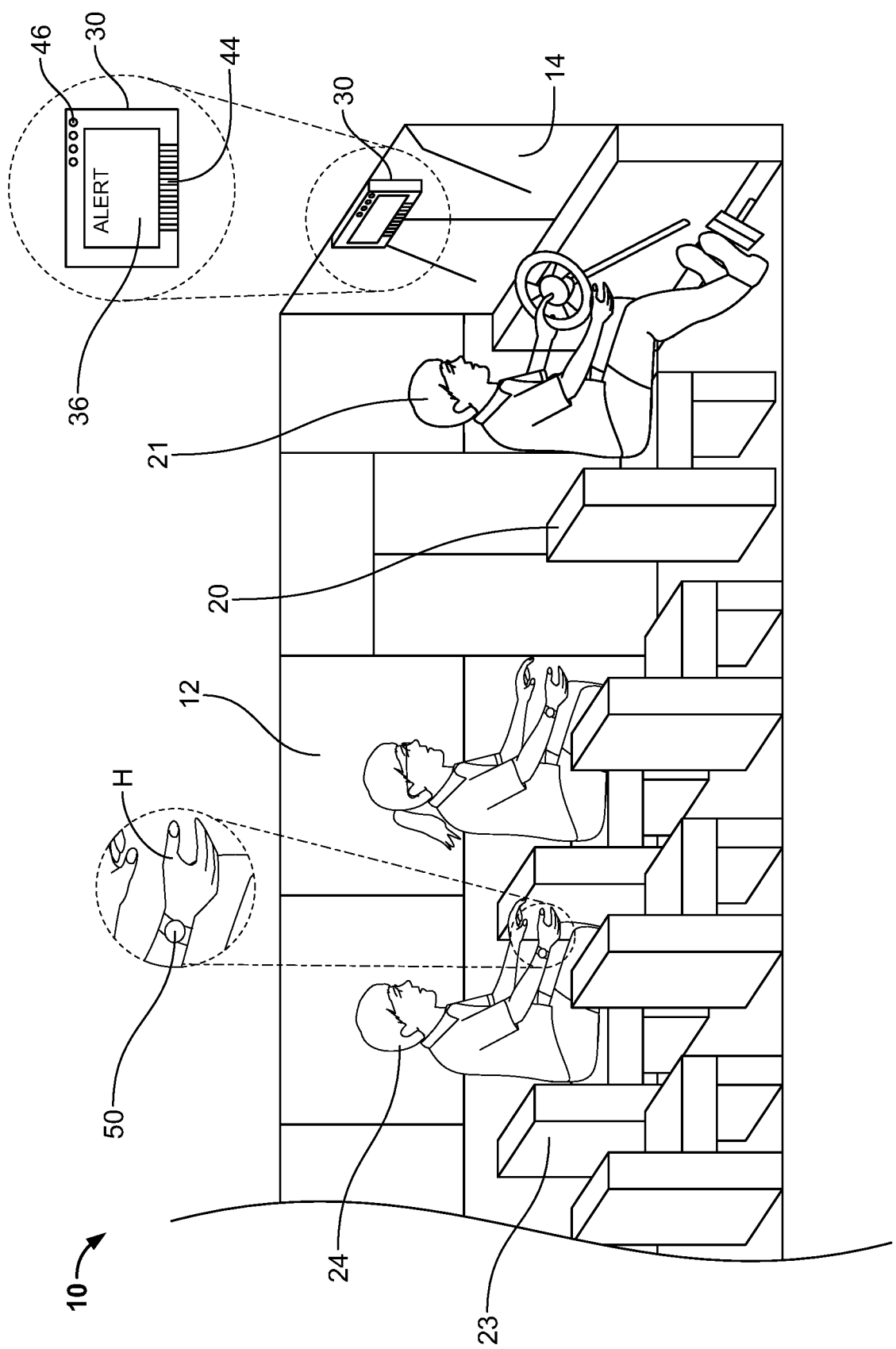
FIG. 1 illustrates a schematic diagram of a system 10 for alerting a driver of a vehicle 12 of presence of a passenger in the vehicle, in accordance with one embodiment of the present disclosure.
Figure 4:
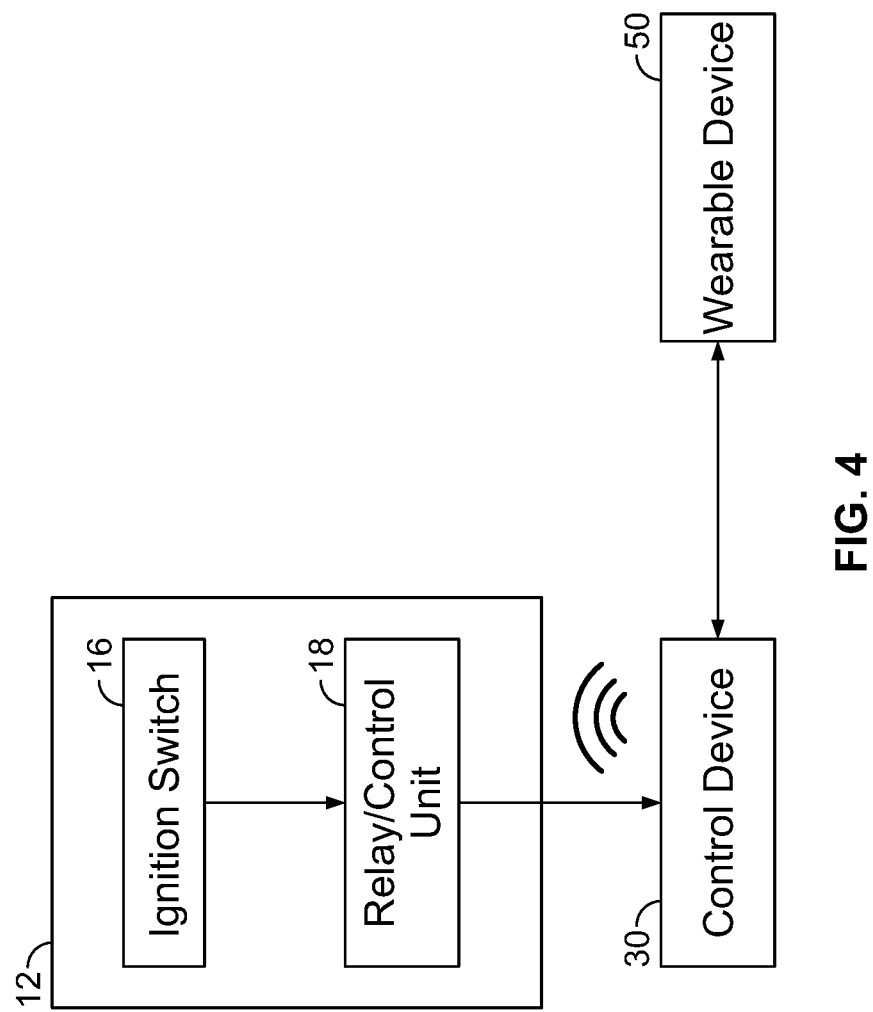
FIG. 4 illustrates operation of the system 10 for alerting a driver of a vehicle 12, in accordance with one embodiment of the present disclosure.

Referring to FIG. 1, a schematic diagram of a system 10 implemented in a vehicle 12 to alert a driver of the vehicle 12 of presence of an occupant or passenger is shown, in accordance with one embodiment of the present disclosure. The vehicle 12 is capable of carrying one or more passengers including but not limited to a bus, truck, car or any other vehicle. Referring to FIGS. 1 and 4, the vehicle 12 may comprise a windshield 14 at the front of the vehicle 12. Further, the vehicle 12 may comprise an ignition switch 16 capable of turning ON or turning OFF of the vehicle 12. Further, the vehicle 12 may comprise a relay or control unit 18 coupled or mounted between an engine (not shown) and the ignition switch 16.

As known, the vehicle 12 may comprise a driver seat 20 to seat a driver 21. Further, the vehicle 12 may include a plurality of passenger seats 23 to seat one or more passengers or occupants 24. The one or more passengers 24 may include adults, children or handicapped individuals.

As can be seen from FIG. 1, the vehicle 12 comprises a control device 30 provided above the windshield 14 of the vehicle 12. Preferably, the control device 30 is positioned in sight of the driver 21. The control device 30 may indicate an electronic device. Referring to FIGS. 1 and 2, the control device 30 may include a first processor 32, a first memory 34, a first display 36, a first interface 38, a first battery 40, a first transceiver 42, a first speaker 44, and an illuminating device 46.

The first processor 32 may be implemented as one or more microprocessors, microcomputers, controllers, digital signal processors, central processing units, state machines, logic circuitries, and/or any devices that manipulate signals based on operational instructions. Among other capabilities, the first processor 32 is configured to fetch and execute computer-readable instructions or program instructions stored in the first memory 34.

The first memory 34 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, and so on.

The first display 36 may include a display screen such as liquid crystal display (LCD) and light-emitting diode (LED). The first display 36 is provided in suitable size so as to display text, graphic, image or video to the driver 21.

The first interface 38 may include software or hardware such as touch interface to operate the control device 30.

The first battery 40 may include a standalone and a rechargeable battery such as Lithium-Ion battery.

The first transceiver 42 is used to transmit and receive signal/data from the control device 30 to external devices. The control device 30 may transmit the data over a short or long-range wired or wireless communication protocol including, but not limited to a cellular network, satellite or any other protocol such as Bluetooth, Wi-Fi, Li-FI, LAN and so on.

The first speaker 44 may indicate an audio output device or buzzer capable of producing sound.

The illuminating device 46 indicates a light emitter, which may include Light Emitting Diode (LED) light capable of producing light.

Referring to FIGS. 1 and 3, the system 10 further comprises a plurality of wearable devices 50 worn by the one or more occupants or passengers 24 of the vehicle 12. As can be seen from FIG. 1, each of the plurality of wearable devices 50 is worn on a hand H of one of the passengers 24. The plurality of wearable devices 50 may include wristwatches, smart watches, tags, straps and so on.

Each of the plurality of wearable devices 50 may comprise a second processor 52, a second memory 54, a second battery 56, a second transceiver 58, and a second speaker 60.

The second processor 52 may be implemented as one or more microprocessors, microcomputers, controllers, digital signal processors, central processing units, state machines, logic circuitries, and/or any devices that manipulate signals based on operational instructions. Among other capabilities, the second processor 52 is configured to fetch and execute computer-readable instructions or program instructions stored in the second memory 54.

The second memory 54 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, and so on.

The second battery 56 may include a standalone and a rechargeable battery such as Lithium-Ion battery.

The second transceiver 58 is used to transmit and receive signal/data from the wearable device 50 to external devices. The wearable device 50 may transmit the data over a short or long-range wired or wireless communication protocol including, but not limited to a cellular network, satellite or any other protocol such as Bluetooth, Wi-Fi, Li-FI, LAN and so on.

The second speaker 60 may indicate an audio output device or buzzer capable of producing sound.

It should be understood that the control device 30 is communicatively or operatively coupled the plurality of wearable devices 50. Further, the control unit 18 of the vehicle 12 is communicatively or operatively coupled the plurality of wearable devices 50 and the control device 30.

Now referring to FIG. 4, operation of the system 10 for alerting the driver 21 of the vehicle 12 when ignition i.e., the ignition switch 16 of the vehicle 12 is turned OFF and the one or more passengers 24 remains inside the vehicle 12 is explained. At first, the plurality of wearable devices 50 might be registered with the control device 30. In order to register the plurality of wearable devices 50 with the control device 30, each of the plurality of wearable devices 50 may be provided with a unique identification number. Further, the unique identification number might be associated with name and location including an address at which the corresponding passenger 24 needs to be dropped i.e., destination of the passenger 24 along a particular route. After registering, details of the name, location and the unique identification number might be stored in the first memory 34.

It should be understood that each of the plurality of wearable devices 50 periodically or in real time communicates with the control device 30. As specified above, the each of the plurality of wearable devices 50 may communicate with the control device 30 via the Bluetooth or any other protocol to determine proximity of the each of the plurality of wearable devices 50 with the control device 30. Preferably, each of the plurality of wearable devices 50 may utilize Bluetooth low Energy in order save charge in the second battery 56 so as to keep the power in the plurality of wearable devices 50 for a longer period of time.

The control unit 18 might check status of the ignition i.e., whether the ignition switch 16 of vehicle 12 is ON or OFF either periodically or in real time. Specifically, the control unit 18 checks when the ignition switch 16 is turned OFF from the turn ON status. When the control unit 18 determines that the ignition switch 16 is turned OFF from turn ON, then the control unit 18 sends signal to the first processor 32 of the control device 30 indicating that the ignition switch 16 is OFF. Subsequently, the first processor 32 instructs the first transceiver 42 to send a message or ping to the plurality of wearable devices 50 in order to determine presence of one or more of the plurality of wearable devices 50 in proximity i.e., inside the vehicle 12. After receiving the ping or signal from the control device 30, if one or more of the plurality of wearable devices 50 provides response to the message or ping, then the first transceiver 42 receives the response and forwards the response to the first processor 32. Subsequently, the first processor 32 instructs one of the first display 36, the first speaker 44 and the illuminating device 46 to alert the driver 21 of the vehicle 12 of presence of the one or more passengers 24 inside the vehicle 12.

In one example, the first processor 32 may instruct the first display 36 to display text such as "ALERT, PASSENGER IS IN THE VEHICLE". In another example, the first processor 32 may instruct the first display 36 to display text such as "IDENTIFICATION NUMBER 100 IS IN THE VEHICLE". In another example, the first processor 32 may instruct the first display 36 to display an image or video indicating presence of the passengers 24 wearing the one or more of the plurality of wearable devices 50 inside the vehicle 12.

In another embodiment, the first processor 32 may instruct the first speaker 44 to produce sound to draw attention of the driver 21 indicating presence of the passengers 24 wearing the one or more of the plurality of wearable devices 50 inside the vehicle 12. In one example, the first processor 32 may be configured to instruct the first speaker 44 to announce the unique identification number or name of the passenger to draw attention of the driver 21 indicating presence of passengers 24 wearing the one or more of the plurality of wearable devices 50 inside the vehicle 12. It should be understood that the first speaker 44 may produce sound loud enough to attract attention of a passerby in the event the driver 21 is not responding to the sound indicating the presence of the passengers 24 wearing the one or more of the plurality of wearable devices 50 inside the vehicle 12.

In another embodiment, the first processor 32 may instruct the illuminating device 44 to illuminate continuously or intermittently to draw attention of the driver 21 indicating presence of passengers 24 wearing the one or more of the plurality of wearable devices 50 inside the vehicle 12.

As specified above, the control device 30 checks with the control unit 18 of the vehicle 12 whether the ignition switch 16 is OFF and instructs one of the first display 36, the first speaker 44 and the illuminating device 46 to alert the driver 21 of the vehicle 12 of presence of the one or more passengers 24 inside the vehicle 12.

In one exemplary implementation, the control device 30 and/or the plurality of wearable devices 50 might be provided with a Global Positioning System (GPS) transponder (not shown). Whenever, one or more passengers 24 is left inside the vehicle 12, then the GPS transponder may send a signal to emergency personnel, for example police in order to alert them of the location of vehicle 12. Upon receiving the signal, the emergency personnel may reach the location of the vehicle 12 and rescue the one or more passengers 24. It is to be noted that the GPS transponder may be activated when the first speaker 44 or the illuminating device 44 is not turned OFF for a predetermined time e.g., five minutes, indicating that the one or more passengers 24 is left inside the vehicle 12 when the ignition switch 16 is turned OFF and a significant time has passed.

Figure 5:
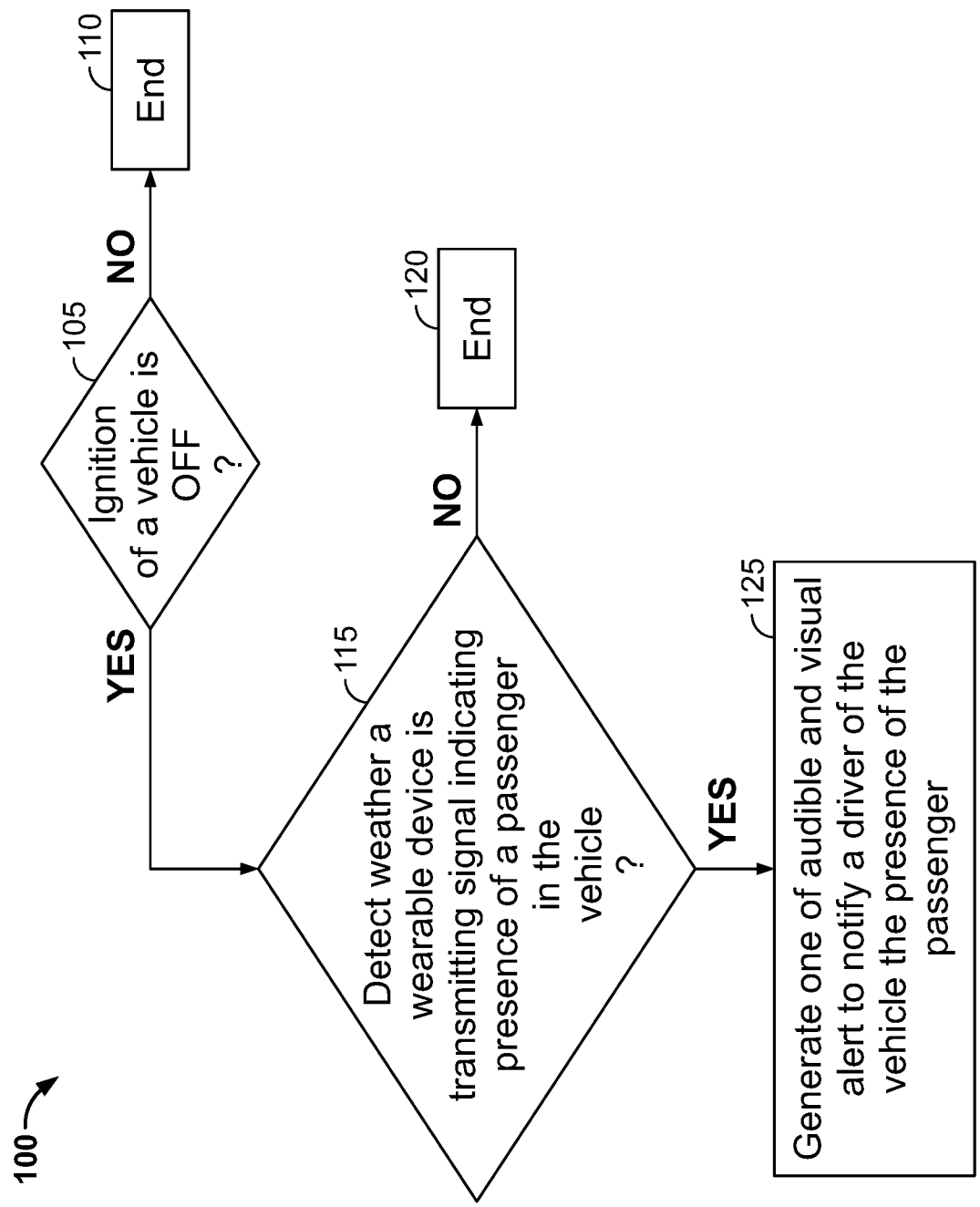
FIG. 5 illustrates a method 100 for alerting a driver of a vehicle of presence of a passenger in the vehicle, in accordance with another embodiment of the present disclosure.

Referring now to FIG. 5, a method 100 for alerting a driver of presence of an occupant or passenger in a vehicle after ignition of the vehicle has been turned OFF is shown, in accordance with an embodiment of the present disclosure. The method 100 may be described in the general context of computer executable instructions or a sequence of steps to be performed for automated checkout. However, the order in which the method 100 is described and is not intended to be construed as a limitation, and any number of the described method blocks can be combined in any order to implement the method 100 or alternate methods. Additionally, individual blocks may be deleted from the method 100 without departing from scope of the disclosure described herein. For ease of explanation, in the embodiments described below, the method 100 may be implemented in the above-described system 100.

At step 105, a control unit 18 of the vehicle 12 checks whether an ignition switch 16 of the vehicle 12 has been turned OFF. If the ignition switch 16 is not turned OFF, then no action is taken as shown in step 110.

If the ignition switch 16 is turned OFF, then the step 115 is performed. The control unit 18 sends a signal to the control device 30 placed in front of the driver 21. At step 115, the control device 30 detects whether any of one or more wearable devices 30 worn by the passengers 24 are present inside the vehicle 12. Specifically, the control device 30 sends a transmission signal to obtain a response from the one or more wearable devices 30 worn by the passengers 24 to indicate presence inside the vehicle 12. In other words, the one or more wearable devices 30 respond to the transmission signal sent by the control device 30. If the control device 30 does not get any response indicating that there are no wearable devices 30 present inside the vehicle 12, then the method proceeds to step 120.

If the control device 30 receives the response to the transmission signal from the one or more wearable devices 30 via the second transceiver 58 indicating presence of passengers inside the vehicle 12, then the method proceeds to step 125.

At step 125, the control device 30 produces one of audio or visual alert to notify a driver 21 of the vehicle 12 of the presence of the passengers 24 in the vehicle 12. As specified above, the control device 30 might produce nose, display text, image or flashlight towards the driver to draw attention of the driver to indicate presence of the passengers inside the vehicle 12.

Based on the above, it is evident that the system helps in alerting a driver of presence of an occupant or passenger in a vehicle after ignition of the vehicle has been turned OFF. As such, the passengers including children or handicapped individuals can be off loaded from the vehicle when the vehicle has been turned OFF or reaches its end of the run.

It should be understood that when the vehicle is being driven along a route, the present disclosure could be employed when the vehicle reaches its certain destination or when the vehicle ignition has been turned OFF. Turning the vehicle ignition OFF caused the contacts of the relay unit to close sending a further signal to the control device, thereby causing the control device to contact the wearable devices and generate an alert to draw attention of the driver of presence of the passengers inside the vehicle.

Further, it is to be noted that the control device comprising the speaker and the illuminating device among others may be provided in the vehicle at the time of manufacturing or may be provided as a standalone device and may be fitted to the vehicle as an accessory. Additionally, the one or more wearable devices may be preinstalled with the intended software to communicate with the control device or may be configured as on when required. As such, the control device and the wearable devices might be used in new or existing vehicles.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for alerting a driver of a vehicle of the presence of a passenger in the vehicle, the system comprising:
    a control unit provided in the vehicle to detect status of an ignition switch of the vehicle;
    a control device operatively coupled to the control unit, wherein the control device is positioned in sight of the driver of the vehicle, the control device is mounted to a windshield of the vehicle, said control device being above of the driver, said control device being in constant abutting contact with said windshield, said control device being entirely above of vehicle seats within the vehicle, said control device extending outwardly and away from said windshield and towards an interior of said vehicle, said control device being entirely above a steering wheel of said vehicle; and
    a plurality of wearable devices, each of the plurality of wearable devices is worn by a passenger in the vehicle, wherein the control unit detects turning OFF of the ignition switch and sends a signal to the control device, wherein the control device sends a transmission signal to the plurality of wearable devices to determine presence of one or more of the plurality of wearable devices, and wherein the control device generates an alert to the driver when one or more of the plurality of wearable devices responds to the transmission signal indicating presence of the passenger inside the vehicle when the ignition switch of the vehicle is turned OFF, said control device including a first display, the control device further includes a first speaker to produce sound in order to alert the driver of presence of the plurality of wearable devices in the vehicle, said first speaker being adjacent to and in constant abutting contact with said first display.

2. The system of claim 1, wherein the first display displays the alert in textual, graphic, image or video format, said first display being centrally located on said control device.

3. The system of claim 1, wherein said first speaker being entirely below said first display, said first speaker extending a partial length of said first display.

4. The system of claim 1, wherein the control device includes an illuminating device to flash light in order to alert the driver of presence of one or more of the plurality of wearable devices in the vehicle, said illuminating device being entirely above of said first display and said first speaker, said illuminating device being located at a corner of said control device.

5. The system of claim 1, wherein said plurality of wearable devices includes a unique identification number, said unique identification number being associated with a name and a destination address of corresponding said passenger.

6. The system of claim 4, wherein said illuminating device includes lights which are evenly spaced apart and parallel to each other.

7. The system of claim 1, wherein said control device includes a first interface, said first interface being a touch interface to operate said control device.

* * * * *